(12) United States Patent
Baize et al.

(10) Patent No.: US 7,003,387 B2
(45) Date of Patent: Feb. 21, 2006

(54) METHOD FOR CONTROLLING AN AUTOMATIC GEARBOX ACCORDING TO A ROAD PROFILE

(75) Inventors: Thierry Baize, Senslis (FR); Christian Taffin, Le Mesnil Saint Denis (FR)

(73) Assignees: Renault S.A.S., Boulogne Billancourt (FR); Peugeot Citroen Automobiles S.A, Neuilly sur Seine (FR)

( * ) Notice: Subject to any disclaimer, the term of this patent is extended or adjusted under 35 U.S.C. 154(b) by 54 days.

(21) Appl. No.: 10/482,732

(22) PCT Filed: Jul. 4, 2002

(86) PCT No.: PCT/FR02/02353

§ 371 (c)(1),
(2), (4) Date: Jan. 5, 2004

(87) PCT Pub. No.: WO03/004910

PCT Pub. Date: Jan. 16, 2003

(65) Prior Publication Data
US 2005/0114003 A1 May 26, 2005

(30) Foreign Application Priority Data
Jul. 6, 2001 (FR) .................................. 01 08986

(51) Int. Cl.
*G06F 19/00* (2006.01)
*F16H 59/48* (2006.01)

(52) U.S. Cl. ......................................... 701/55; 701/56

(58) Field of Classification Search ................. 701/55, 701/56, 65; 477/97
See application file for complete search history.

(56) References Cited

U.S. PATENT DOCUMENTS

| | | | | |
|---|---|---|---|---|
| 4,788,892 A * | 12/1988 | Komoda et al. | ............ | 477/120 |
| 4,789,937 A * | 12/1988 | Yasue et al. | .................. | 701/62 |
| 5,025,684 A * | 6/1991 | Stehle et al. | .................. | 477/62 |
| 5,361,207 A * | 11/1994 | Hayafune | ..................... | 701/57 |
| 5,544,053 A * | 8/1996 | Nakashima | .................. | 701/57 |
| 5,681,240 A * | 10/1997 | Sunada et al. | ............... | 477/125 |
| 5,738,606 A * | 4/1998 | Bellinger | ...................... | 477/111 |
| 5,885,186 A * | 3/1999 | Van Wijk et al. | .............. | 477/43 |
| 6,033,339 A * | 3/2000 | Aberson et al. | ............... | 477/46 |
| 6,456,923 B1 * | 9/2002 | Wolf et al. | .................... | 701/72 |
| 6,519,523 B1 * | 2/2003 | Schulke et al. | ............... | 701/70 |
| 2002/0049116 A1 * | 4/2002 | Shiiba et al. | .................. | 477/97 |

FOREIGN PATENT DOCUMENTS

EP 0 965 777 12/1999
EP 1 109 025 6/2001

* cited by examiner

*Primary Examiner*—Michael J. Zanelli
(74) *Attorney, Agent, or Firm*—Young & Thompson

(57) ABSTRACT

A method for automatically controlling the gearbox of a road vehicle uses a computer using information on displacement speed and transversal acceleration of the vehicle and engine load in order to apply various shifting rules according to the road profile. The gearbox computer applies different gear shifting rules according to the value of a coefficient of activity Kbend depending on the displacement speed of the vehicle (V), the lateral acceleration of the vehicle (Gt) and the derivative thereof in relation to time (dGt/dt).

19 Claims, 2 Drawing Sheets

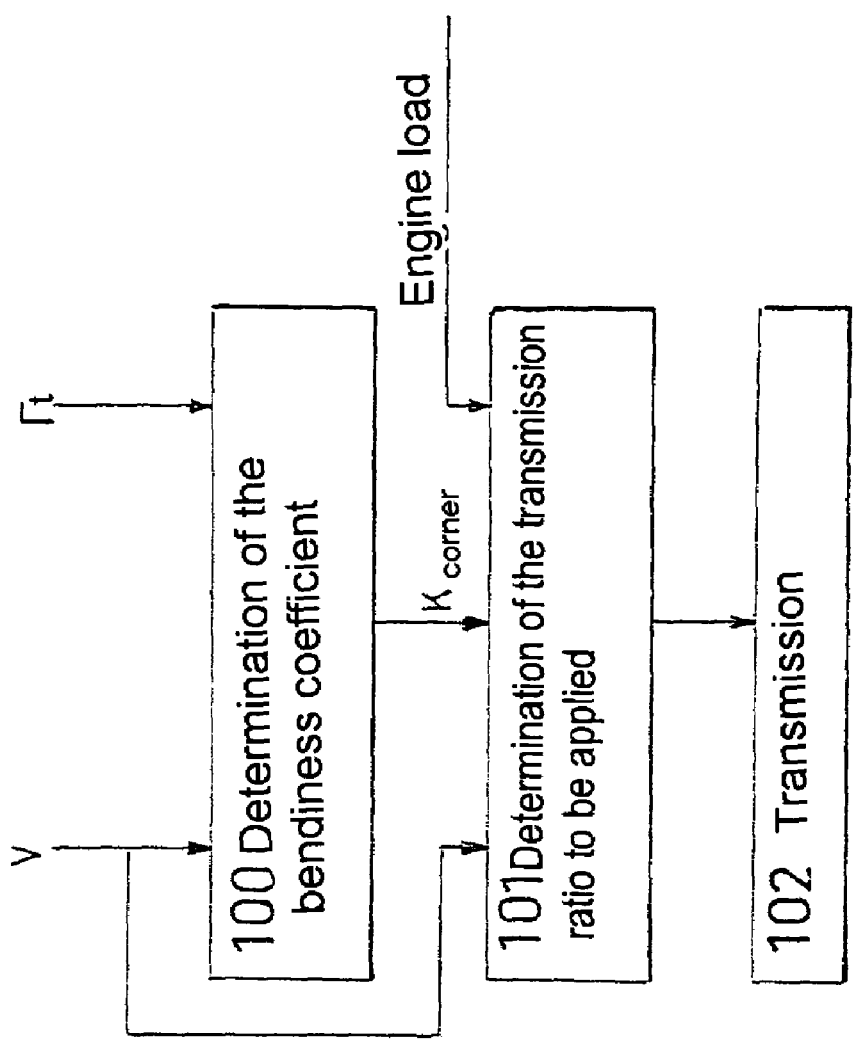

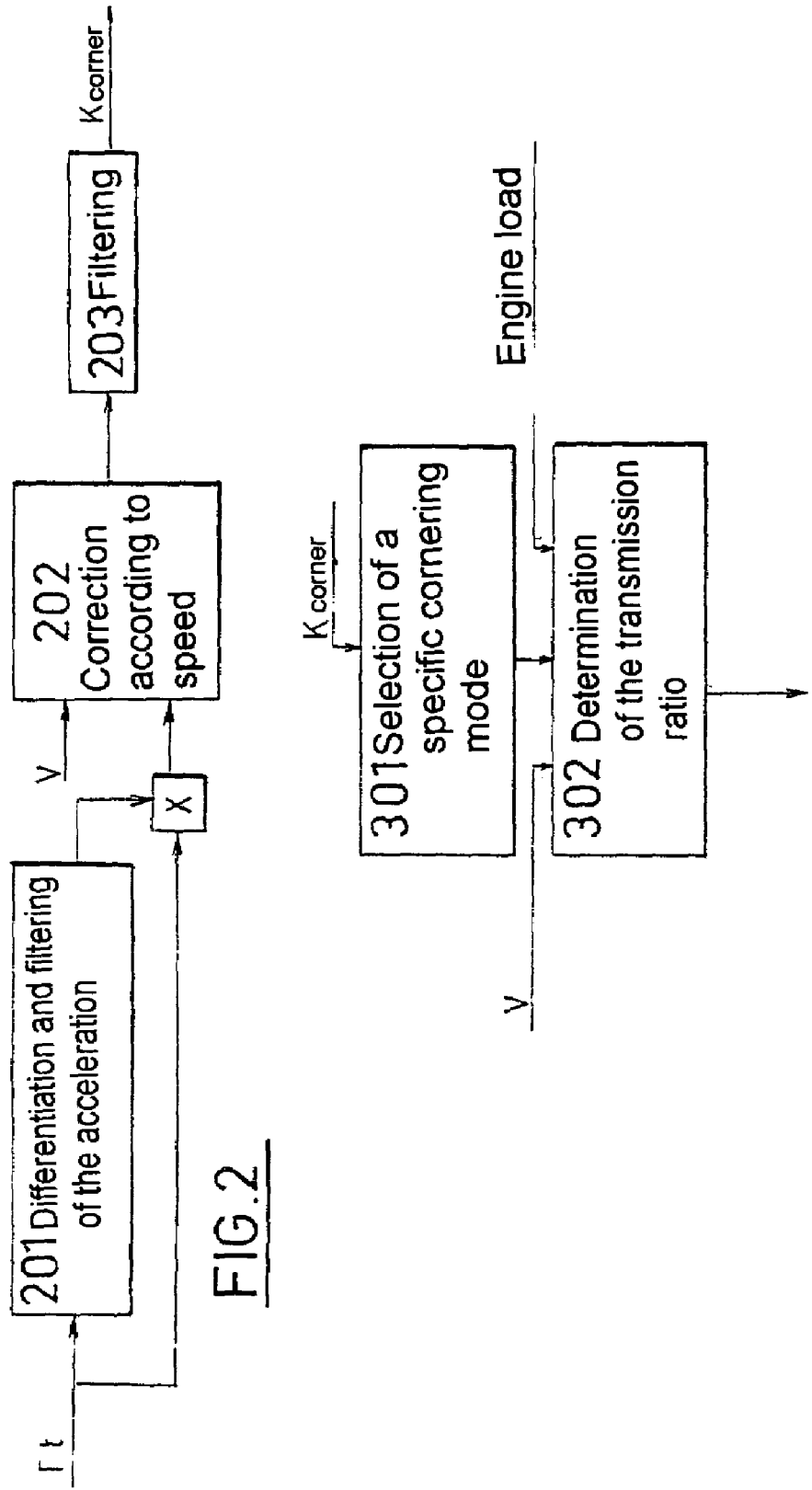

METHOD FOR CONTROLLING AN AUTOMATIC GEARBOX ACCORDING TO A ROAD PROFILE

FIELD OF THE INVENTION

The present invention pertains to the control of automatic or stepped-ratio automated transmissions.

More precisely, it relates to a method of controlling a road vehicle automatic transmission by computer utilizing the information regarding speed of travel and transverse acceleration of the vehicle and engine load, so as to apply various road profile dependent shift laws to the transmission.

This invention applies equally well to the control of transmissions of the automatic gearbox type comprising one or more epicyclic gear trains associated with several brakes or clutches placed under the supervision of an electronic computer, as to the control of transmissions of the type comprising an assembly of sliding gears and synchromeshes with robotized control, or of the continuously variable transmission type.

BACKGROUND OF THE INVENTION

It is based on utilizing the level of the vehicle's lateral acceleration, measured or estimated while cornering, to determine a criterion making it possible to evaluate the type of road profile (bendy or otherwise), doing so in order to impose various shift laws for the gears (or "variograms" in the case of a continuously variable transmission) on for example the computer of an automatic transmission, these laws then being suitable for the bendy profile of said road.

Several solutions are known for imposing various shift laws, as a function for example of the driver's style of driving, of the profile of the road (rising and falling). These solutions do not enable automatic transmissions to be suitably adapted when the road becomes bendy. Specifically, over such stretches, it would be desirable to adopt a set of shift laws making it possible to keep spare torque for the wheel (by increasing for example the engine revs), so as to aid pick-ups after each cornering, and thus avoid phenomena of ratio hunting (or of variations in ratio in the case of continuously variable transmissions) and which detract from the pleasure of driving the vehicle on bendy roads.

OBJECT OF THE INVENTION

The invention aims to remedy the drawbacks of the known systems for allowing for the profile of the road.

SUMMARY OF THE INVENTION

With this objective, it proposes that the computer of the transmission apply various shift laws for the ratios according to the value of an activity coefficient Kcorner dependent on the speed of travel of the vehicle (V), on the lateral acceleration of the vehicle (Gt) and on its derivative with respect to time (dGt/dt).

If the transmission has stepped ratios, the computer applies various discrete change of ratio laws.

If on the other hand it is a continuously variable or infinitely variable transmission, it applies various continuous change of ratio variograms.

Preferably, the activity coefficient Kcorner is obtained from the product of the transverse acceleration (Gt) and its derivative with respect to time (dGt/dt).

The lateral acceleration of the vehicle can be determined either from an acceleration sensor, or according to a reconstruction procedure based on information representative of the angle of rotation of the steering wheel or else on information representative of the speed of the wheels, such as described in French Patent application No. 99-15865 as yet unpublished.

BRIEF DESCRIPTION OF THE DRAWINGS

Other characteristics and advantages of the invention will become clearly apparent on reading the following description of a particular embodiment thereof while referring to the appended drawings, in which:

FIG. 1 diagrammatically represents the method according to the invention,

FIG. 2 brings together in a functional diagram, the main steps of the proposed strategy for determining the bendiness factor of the road Kcorner FIG. 3 brings together in a functional diagram, the proposed strategy for determining the transmission ratio suited to the bendiness of the road.

DETAILED DESCRIPTION OF THE INVENTION

The various items of information regarding vehicle speed (V) and transverse acceleration (Gt) which are mentioned in FIG. 1 are utilized in accordance with the invention by a specific unit 100 which determines a bendiness coefficient Kcorner. The latter then feeds the block 101 which also receives other information representative of the forward speed of the vehicle V and of the is engine load "load-_engine" which may by way of nonlimiting indication be the angle of opening of the throttle valve or the accelerator pedal, or else a power or a torque delivered by said engine. This block 101 determines the transmission ratio "ratio" to be applied to the transmission represented by the block 102; this determination is performed according to the method described in the invention, by selecting a set of shift laws (in the case of stepped-ratio transmissions) or of a "variogram" (in the case of continuous-ratio transmissions), which is dependent on Kcorner.

On the basis of the transverse acceleration "Gt", the block 201 determines the filtered derivative "dGt/dt" of the transverse acceleration (cf. FIG. 2), then the product of "Gt" and "dGt/dt". This product is corrected according to the forward speed of the vehicle in the block 202. The result of this operation is then filtered in the block 203 which ultimately determines the coefficient Kcorner. This determination of Kcorner makes it possible, when cornering, to weight the cornering dynamics of the vehicle by the level of transverse acceleration which is achieved and also according to the speed of the vehicle; thus, a driver who drives relatively sportily on a bendy road will have a high coefficient Kcorner, and which is weighted according to the speed of the vehicle so as to avoid overly frequent detections during urban type driving or on freeways at sustained speed.

The block 301 (cf. FIG. 3) determines on the basis of the bendiness coefficient Kcorner a set of gear change laws (or "variogram" in the case of a continuous ratio transmission). By way of nonlimiting example, when Kcorner is greater than a specified threshold, a set of gear change laws which is suited to the fact that the road is regarded as bendy is adopted. This set of shift laws makes it possible to increase the spare motive power (favouring in particular the lower ratios), doing so in order to aid the pick-up of the vehicle when coming out of the corner. When Kcorner is below the specified threshold, a set of gear change laws which is suited to the "normal" driving conditions, that is to say suited to a road requiring little cornering is adopted.

The block 302 determines in a conventional manner the transmission ratio to be applied to the transmission, from the information representative of the forward speed of the vehicle (V) and of the engine load which may by way of nonlimiting indication be the angle of opening of the throttle valve or the accelerator pedal, or again a power or a torque delivered by said engine.

What is claimed is:

1. A method of controlling a road vehicle automatic transmission by computer utilizing the information regarding speed of travel and transverse acceleration of the vehicle and engine load, so as to apply various road profile dependent shift laws to the transmission, wherein the computer of the transmission applies various shift laws for the ratios according to the value of an activity coefficient Kcorner dependent on the speed of travel of the vehicle (V), on the lateral acceleration of the vehicle (Gt) and on its derivative with respect to time (dGt/dt), and wherein the computer applies various discrete change of ratio laws.

2. The method of control as claimed in claim 1, characterized in that the computer applies various continuous change of ratio variograms.

3. The method of control as claimed in claim 2, characterized in that the activity coefficient Kcorner is obtained from the product of the transverse acceleration (Gt) and its derivative with respect to time (dGt/dt).

4. The method of control as claimed in claim 2, characterized in that the computer adopts a set of shift laws which is suitable for roads which are not very bendy when the activity coefficient Kcorner is below a specified threshold.

5. The method of control as claimed in claim 2, characterized in that the information regarding engine load is given by the opening of the engine throttle valve.

6. The method of control as claimed in claim 1, characterized in that the information regarding engine load is given by the opening of the engine throttle valve.

7. The method of control as claimed in claim 1, characterized in that the information regarding engine load is given by the position of the accelerator pedal.

8. The method of control as claimed in claim 1, characterized in that the information regarding engine load is given by a measurement of the power provided by the engine.

9. The method of control as claimed in claim 1, characterized in that the information regarding engine load is given by a measurement of the torque delivered by the engine.

10. The method of control as claimed in claim 1, characterized in that the activity coefficient Kcorner is obtained from the product of the transverse acceleration (Gt) and its derivative with respect to time (dGt/dt).

11. The method of control as claimed in claim 1, characterized in that the computer adopts a set of shift laws which is suitable for roads which are not very bendy when the activity coefficient Kcorner is below a specified threshold.

12. The method of control as claimed in claim 1, characterized in that the information regarding engine load is given by the opening of the engine throttle valve.

13. A method of controlling a road vehicle automatic transmission by computer utilizing the information regarding speed of travel and transverse acceleration of the vehicle and engine load, so as to apply various road profile dependent shift laws to the transmission, wherein the computer of the transmission applies various shift laws for the ratios according to the value of an activity coefficient Kcorner dependent on the speed of travel of the vehicle (V), on the lateral acceleration of the vehicle (Gt) and on its derivative with respect to time (dGt/dt), and wherein the activity coefficient Kcorner is obtained from the product of the transverse acceleration (Gt) and its derivative with respect to time (dGt/dt).

14. The method of control as claimed in claim 13, characterized in that the product of the transverse acceleration (Gt) and its derivative with respect to time (dGt/dt) is weighted by the speed of travel of the vehicle.

15. The method of control as claimed in claim 14, characterized in that the computer adopts a set of shift laws which is suitable for roads which are not very bendy when the activity coefficient Kcorner is below a specified threshold.

16. The method of control as claimed in claim 14, characterized in that the information regarding engine load is given by the opening of the engine throttle valve.

17. The method of control as claimed in claim 13, characterized in that the computer adopts a set of shift laws which is suitable for roads which are not very bendy when the activity coefficient Kcorner is below a specified threshold.

18. The method of control as claimed in claim 13, characterized in that the information regarding engine load is given by the opening of the engine throttle valve.

19. A method of controlling a road vehicle automatic transmission by computer utilizing the information regarding speed of travel and transverse acceleration of the vehicle and engine load, so as to apply various road profile dependent shift laws to the transmission, wherein the computer of the transmission applies various shift laws for the ratios according to the value of an activity coefficient Kcorner dependent on the speed of travel of the vehicle (V), on the lateral acceleration of the vehicle (Gt) and on its derivative with respect to time (dGt/dt), and wherein the computer adopts a set of shift laws which is suitable for roads which are not very bendy when the activity coefficient Kcorner is below a specified threshold.

* * * * *